United States Patent Office 3,345,151
Patented Oct. 3, 1967

3,345,151
HERBICIDAL COMPOSITION AND METHOD
John F. Olin, Ballwin, Mo., assignor to Monsanto Company, St. Louis, Mo., a corporation of Delaware
No Drawing. Filed Mar. 21, 1966, Ser. No. 535,667
10 Claims. (Cl. 71—118)

ABSTRACT OF THE DISCLOSURE

Compositions containing a compound of the formula

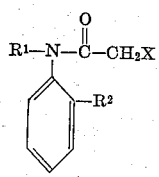

wherein $R^1$ is alkyl of not more than 6 carbon atoms, $R^2$ is alkoxy of not more than 4 carbon atoms and X is Cl or Br, have phytotoxic utility.

---

This application is a continuation-in-part of copending application Ser. No. 398,400, filed Sept. 22, 1964, now U.S. Patent 3,268,584, which is a continuation-in-part of application Ser. No. 134,163, filed Aug. 28, 1961, now abandoned.

This invention relates to phytotoxicants and more particularly to phytotoxic compositions and methods of controlling or modifying the growth of plants.

The term "phytotoxicant" as used herein and in the appended claims means materials having a modifying effect upon the growth of plants. Such modifying effects include all deviations from natural development, for example, killing, retardation, defoliation, desiccation, regulation, stunting, tillering, stimulation, dwarfing and the like. In like manner, "phytotoxic" and "phytotoxicity" are used to identify the growth modifying activity of the compounds and compositions of this invention.

The term "plant" as used herein and in the appended claims means germinant seeds, emerging seedlings and established vegetation including the roots and aboveground portions.

An object of this invention is to provide novel phytotoxic or herbicidal compositions. Another object is to provide methods for the control or modification of plants. These and other objects will be apparent from a consideration of the accompanying disclosure and the appended claims.

According to the present invention, the growth of germinant seeds, emergent seedlings, and established vegetation can be controlled or modified by exposing the germinant seeds, emerging seedlings or the roots or aboveground portions of established vegetation to the action of an effective amount of one or more of the α-haloacetanilides of the formula

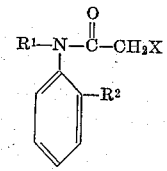

wherein $R^1$ is alkyl having from 1 to 6 carbon atoms, $R^2$ has not more than 4 carbon atoms and is selected from the group consisting of alkoxy, primary alkyl and secondary alkyl, and X is halogen selected from the group consisting of chloride and bromide, provided that X is only chloride when $R^1$ is tert-alkyl and $R^2$ is selected from the group consisting of primary alkyl and secondary alkyl.

The nitrogen substituent, $R^1$ in the formula above is alkyl of not more than 6 carbon atoms having straight or branched chain configuration. Suitable $R^1$ alkyls include by way of example and not limitation methyl, ethyl, propyl, isopropyl, n-butyl, isobutyl, sec-butyl, tert-butyl, n-amyl, tert-amyl, n-hexyl, and the like.

The ortho substituent, $R^2$ in the formula above, is alkoxy, primary alkyl or secondary alkyl of not more than 4 carbon atoms. Representative $R^2$ ortho substituents include primary and secondary alkyl, for example, methyl, ethyl, n-propyl, isopropyl, n-butyl, and isobutyl and alkoxy, for example, methoxy, ethoxy, n-propoxy, isopropoxy, n-butoxy, isobutoxy, sec-butoxy and tert-butoxy.

The compounds of the above formula are effective as general phytotoxicants including post-emergent phytotoxicants and pre-emergent phytotoxicants, but their most outstanding utility is as pre-emergent phytotoxicants. Furthermore, these compounds are characterized by a broad spectrum of herbicidal or phytotoxicant activity, i.e. they modify the growth of a wide variety of plants including both broadleaf and grass plants. For the sake of brevity and simplicity, the term "active ingredient" will be used hereinafter to describe the novel phytotoxicants of the above formula.

The phytotoxic or herbicidal compositions of this invention contain at least one active ingredient and a material referred to in the art as a phytotoxic adjuvant in liquid or solid form. The phytotoxic compositions are prepared by admixing the active ingredient with an adjuvant including diluents, extenders, carriers and conditioning agents to provide compositions in the form of finely-divided particulate solids, granules, pellets, solutions and aqueous dispersions or emulsions. Thus the active ingredient can be used with an adjuvant such as a finely-divided particulate solid, a solvent liquid of organic origin, water, a wetting agent, dispersing agent, an emulsifying agent or any suitable combination of these.

The term "phytotoxic composition" as used herein and in the appended claims is intended to mean not only compositions in a suitable form for application but also concentrated compositions which require dilution or extension with a suitable quantity of additional liquid or solid adjuvant prior to application.

The α-haloacetanilides used in the phytotoxic compositions of this invention and detailed processes for preparing them are disclosed in copending application Ser. No. 398,400, filed Sept. 22, 1964, now U.S. Patent No. 3,268,584. In general, they are prepared by haloacetylation of suitable N-substituted and ortho-substituted aromatic amines, which can be prepared, for example, by the process disclosed in application Ser. No. 824,455, filed July 2, 1959, and now abandoned. The haloacetylating agent is preferably a haloacetic anhydride, such as chloroacetic anhydride, or a haloacetyl halide, such as chloroacetyl chloride, bromoacetyl bromide, and the like.

The haloacetylation reaction is preferably conducted in the presence of a suitable liquid reaction medium. The liquid reaction medium must be anhydrous if the acetylating agent is a haloacetic anhydride. However, anhydrous media or aqueous media can be used with haloacetyl halide acetylating agents. Suitable reaction media for use with either acetylating agent include for example, benzene, diethyl ether, hexane, methylethyl ketone, chlorobenzene, toluene, chloroform, and the xylenes. It is preferred that an acid acceptor be present in the reaction zone to neutralize the acid formed. Suitable acid acceptors for anhydrous systems include the N-substituted ortho-substituted aromatic amine reactants, which may be present in the reaction zone in an amount greater than that required for the acetylation, tertiary amines, and pyridine. Acid acceptors for aqueous systems include alkali or alkaline earth hydroxides and alkali or alkaline earth metal carbonates or bicarbonates.

The haloacetylation reaction is generally carried out at a temperature below room temperature, preferably in the range of from 0° C. to 15° C. Although the haloacetylation reaction can be carried out using stoichiometric amounts of reactants, it is usually preferable to use from 2% to 5% of an excess of the acetylating agent. The acetanilide products can be separated from the reaction mixture by conventional methods such as distillation or fractional crystallization from the reaction medium or from solvents.

As an example, N-tert-butyl-2-chloro-2'-methylacetanilide is prepared by heating 49 g. (0.33 mole) of N-tert-butyl-2-methylaniline (0.33 mol) of chloroacetic anhydride, and 100 ml. of chloroform under reflux for a period of 10 minutes. The reaction mixture is evaporated overnight under a hood and the residue obtained first washed with water and then with dilute potassium carbonate. Upon distillation there is obtained a fraction boiling at 138–139° C. Crystallization of the product from heptane gives 42 g. of the N-tert-butyl-2-chloro-2'-methylacetanilide which is a colorless solid having a melting point of 47.4–48.4° C. The other α-haloacetanilides used in the compositions and methods of this invention are prepared in the same general manner as above.

The following examples will illustrate the invention. In these examples, as well as in the specification and appended claims, parts and percent are by weight unless otherwise indicated.

EXAMPLE 1

The pre-emergent phytotoxic activity of representative N-substituted ortho-substituted α-haloacetanilides was determined in greenhouse tests in which a specific number of seeds of 12 different plates, each representing a principal botanical type, were planted in greenhouse flats. A good grade of top soil was placed in either 9½" x 5¾" x 2¾" or 9" x 13" x 2" aluminum pans and compacted to a depth of ⅜ inch from the top of the pan. On top of the soil were placed five seeds of each of radish, morning glory, and tomato; 10 seeds of each of sugar beet, sorghum, and brome grass; 20 seeds of each of wild buckwheat, giant foxtail, rye grass, and wild oat; approximately 20 to 30 (a volume measured) of each of pigweed and crab grass; and either 2 or 3 seeds of soybean. Two different type plantings were made. In one planting the phytotoxic composition was applied to the surface of the soil and in the other the phytotoxic composition was admixed with or incorporated in the top layer of soil. In the surface application plantings, the seeds were arranged with 3 soybean seeds across the center of the large aluminum pan, the monocotyledon or grass seeds scattered randomly over one-third of the soil surface, and the dicotyledon or broadleaf seeds scattered randomly over the remaining one-third of the soil surface at the other end of the pan. The seeds were then covered with ⅜ inch of prepared soil mixture and the pan leveled. In the soil-incorporation plantings, 450 g. of prepared soil mixture was blended with the phytotoxic composition in a separate mixing container for covering the seeds which were planted in the smaller of the two aluminum pans. The seeds in this planting were arranged with a soybean seed planted in diagonal corners and the monocotyledon seeds and the dicotyledon seeds each scattered randomly over one-half of the soil surface. The phytotoxicant-incorporated soil mixture was used to cover the seeds. The phytotoxic composition was applied in the surface-application plantings prior to the watering of the seeds. This application of the phytotoxic composition was made by spraying the surface of the soil with an acetone solution containing a sufficient quantity of the candidate chemical to obtain the desired rate per acre on the soil surface. The watering of the seeds in both type plantings was accomplished by placing the aluminum pans in a sand bench having ½-inch depth of water thereon and permitting the soil in the pans to absorb moisture through the perforated bottom of the pans.

The pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The phytotoxic activity index is based on the average percent germination of each seed lot. The activity index is converted to a relative numerical scale for the sake of brevity and simplicity in the examples. The pre-emergent phytotoxic activity index used in this and the following pre-emergent examples is as follows:

| Average Percent Germination | Numerical Scale | Phytotoxic Activity |
| --- | --- | --- |
| 76–100 | 0 | No phytotoxicity. |
| 51–75 | 1 | Slight phytotoxicity. |
| 26–50 | 2 | Moderate phytotoxicity. |
| 0–25 | 3 | Severe phytotoxicity. |

The pre-emergent phytotoxic activity of representative N-substituted ortho-substituted α-haloacetanilides is recorded in Table I for various application rates of the α-haloacetanilide in both surface and soil-incorporated applications. In Table I, the various seeds are represented by letters as follows:

A—General grass  
B—General broadleaf  
C—Morning glory  
D—Wild oats  
E—Brome grass  
F—Rye grass  
G—Radish  
H—Sugar beet  
I—Foxtail  
J—Crab grass  
K—Pigweed  
L—Soybean  
M—Wild buckwheat  
N—Tomato  
O—Sorghum Individual phytotoxic ratings for each plant type are reported in Table I. In addition, the total phytotoxic rating for all grass plants and the total phytotoxic rating for all broadleaf plants are also reported in Table I. For grasses, the maximum total is 18 for the 6 grass plants at ratings of 3. For broadleafs, the maximum total is 21 for the 7 broadleaf plants at ratings of 3.

soil sterilization applications. It will also be noted from the data in Table I that unusual grass specificity can be obtained at lower levels of application. Such grass specificity is achieved at extremely low application rates, for example, at rates as low as 0.05 lb. per acre with 2-chloro-N,2'-dimethylacetanilide, so that very economical treatment is possible. The three botanical types or genera of grasses effectively controlled by the N-substituted ortho-substituted α-haloacetanilides of this invention embrace a large number of plant systems frequently found in vegetable crops. But these N-substituted ortho-substituted α-haloacetanilides are not limited to removing grasses from broadleaf plants, since the selective action is such that certain genera of grasses can be removed from corn, which is also a genus of grass.

EXAMPLE 2

The lack of phytotoxic activity of closely related com-

TABLE I.—PRE-EMERGENCE PHYTOTOXIC ACTIVITY OF THE N-SUBSTITUTED ORTHO SUBSTITUTED ALPHA-HALOACETANILIDES

| Compound | Rate, Lb./acre | Plant | | | | | | | | | | | | | | | Total Phytotoxic Rating | | Comments |
|---|---|---|---|---|---|---|---|---|---|---|---|---|---|---|---|---|---|---|---|
| | | A | B | C | D | E | F | G | H | I | J | K | L | M | N | O | Grass | Broadleaf | |
| N-tert-Butyl-2-chloro-2-methylacetanilide | 25 | 3 | 3 | 3 | 3 | 3 | 3 | 3 | 3 | 3 | 3 | 3 | 2 | 3 | 3 | 3 | 18 | 20 | (¹) |
| | 5 | 3 | 3 | 3 | 3 | 3 | 3 | 2 | 2 | 3 | 3 | 3 | 2 |  | 3 | 3 | 18 | *15 | (²) |
| | 1 | 3 | 2 | 3 | 0 | 3 | 3 | 1 | 2 | 3 | 3 | 3 | 2 | 1 | 2 | 3 | 15 | 14 | (²) |
| | 0.15 | 2 | 0 | 0 | 0 | 0 | 3 | 0 | 0 | 3 | 3 | 3 | 0 |  | 0 | 0 | 9 | *3 | (²) |
| 2-chloro-N,2'-di-(1-methylpropyl)-acetanilide | 25 | 3 | 2 | 0 | 2 | 3 | 3 | 3 | 1 | 2 | 3 | 3 | 1 | 0 | 1 | 3 | 18 | 10 | (¹) |
| | 5 | 3 | 0 | 0 | 0 | 0 | 3 | 3 | 0 | 3 | 3 | 3 | 0 |  | 0 | 3 | 15 | *2 | (²) |
| | 1 | 2 | 0 | 1 | 0 | 3 | 3 | 0 | 0 | 2 | 3 | 3 | 0 |  | 0 | 1 | 12 | *4 | (²) |
| N-tert-Butyl-2-chloro-2'-ethylacetanilide | 25 | 3 | 3 | 3 | 3 | 3 | 3 | 3 | 3 | 3 | 3 | 3 | 0 | 3 | 3 | 3 | 18 | *20 | (¹) |
| | 5 | 3 | 2 | 3 | 3 | 2 | 3 | 3 | 1 | 3 | 3 | 3 | 1 |  | 0 | 3 | 17 | *10 | (²) |
| | 1 | 2 | 0 | 1 | 0 | 1 | 3 | 0 | 1 | 3 | 3 | 2 | 0 |  | 0 | 1 | 10 | *4 | (²) |
| 2-chloro-N-isopropyl-2'-methylacetanilide | 25 | 3 | 3 | 3 | 3 | 3 | 3 | 2 | 3 | 3 | 3 | 3 | 1 |  | 1 | 3 | 18 | *15 | (²) |
| | 5 | 3 | 3 | 3 | 2 | 3 | 3 | 3 | 3 | 3 | 3 | 3 | 1 |  | 3 | 3 | 17 | *12 | (¹) |
| | 1 | 3 | 0 | 0 | 3 | 3 | 3 | 0 | 0 | 3 | 3 | 3 | 1 | 0 | 0 | 3 | 18 | 4 | (²) |
| 2-chloro-2'-methyl-N-(1-methylpropyl)-acetanilide | 0.25 | 2 | 0 | 0 | 0 | 0 | 1 | 2 | 0 | 0 | 3 | 3 | 0 | 0 | 0 | 0 | 9 | 1 | (²) |
| | 5 | 2 | 1 | 0 | 0 | 0 | 3 | 0 | 0 | 3 | 3 | 3 | 0 | 0 | 0 | 0 | 9 | 6 | (¹) |
| 2-chloro-2'-ethyl N-isopropylacetanilide | 1 | 2 | 0 | 0 | 0 | 3 | 3 | 0 | 0 | 3 | 3 | 3 | 0 | 0 | 0 | 0 | 12 | 3 | (²) |
| | 5 | 3 | 1 | 0 | 3 | 3 | 3 | 0 | 0 | 3 | 3 | 3 | 0 | 0 | 0 | 2 | 17 | 6 | (¹) |
| | 1 | 3 | 0 | 0 | 2 | 3 | 3 | 0 | 0 | 3 | 3 | 3 | 0 | 0 | 0 | 3 | 17 | 3 | (²) |
| 2-chloro-2'-ethyl-N-(1-methylpropyl)-acetanilide | 0.25 | 2 | 0 | 0 | 0 | 2 | 3 | 0 | 0 | 3 | 3 | 1 | 0 | 0 | 0 | 0 | 11 | 1 | (²) |
| 2-chloro-2'-isopropyl-N-methylacetanilide | 5 | 3 | 1 | 0 | 2 | 3 | 3 | 0 | 0 | 3 | 3 | 3 | 0 | 3 | 0 | 0 | 14 | 6 | (¹) |
| | 5 | 3 | 1 | 2 | 3 | 3 | 3 | 1 | 2 | 3 | 3 | 3 | 0 |  | 0 | 2 | 17 | *8 | (²) |
| | 1 | 3 | 0 | 0 | 3 | 3 | 3 | 0 | 1 | 3 | 3 | 3 | 0 | 0 | 0 | 0 | 15 | 4 | (²) |
| N-tert-Amyl-2-chloro-2'-methylacetanilide | 0.25 | 2 | 0 | 0 | 0 | 2 | 3 | 0 | 0 | 3 | 3 | 3 | 0 | 0 | 0 | 0 | 11 | 0 | (²) |
| | 5 | 3 | 3 | 3 | 2 | 3 | 3 | 1 | 1 | 3 | 3 | 3 | 3 | 2 | 3 | 3 | 18 | 16 | (¹) |
| | 1 | 3 | 0 | 0 | 3 | 3 | 3 | 0 | 0 | 3 | 3 | 3 | 1 | 0 | 0 | 2 | 16 | 2 | (²) |
| 2-chloro-N-ethyl-2'-methylacetanilide | 5 | 3 | 1 | 3 | 3 | 3 | 3 | 0 | 1 | 3 | 3 | 3 | 0 | 0 | 1 | 3 | 18 | 5 | (¹) |
| | 1 | 3 | 0 | 0 | 2 | 3 | 2 | 0 | 0 | 3 | 3 | 3 | 0 | 0 | 0 | 3 | 18 | 6 | (²) |
| | 0.10 | 3 | 0 | 2 | 0 | 2 | 3 | 0 | 0 | 3 | 3 | 3 | 0 | 0 | 2 | 3 | 15 | 0 | (²) |
| 2-chloro-N,2'-dimethylacetanilide | 5 | 3 | 2 | 0 | 2 | 3 | 3 | 1 | 1 | 3 | 3 | 3 | 3 | 1 | 2 | 3 | 17 | 11 | (¹) |
| | 1 | 3 | 0 | 0 | 3 | 3 | 3 | 0 | 0 | 3 | 3 | 3 | 2 | 0 | 0 | 3 | 17 | 2 | (²) |
| | 0.25 | 3 | 0 | 0 | 3 | 3 | 3 | 0 | 0 | 3 | 3 | 2 | 0 | 1 | 0 | 0 | 15 | 3 | (²) |
| 2-bromo-N,2'-dimethylacetanilide | 0.05 | 3 | 0 | 0 | 0 | 3 | 3 | 0 | 0 | 3 | 3 | 2 | 0 | 0 | 0 | 0 | 14 | 0 | (²) |
| N-tert-Butyl-2-chloro-2'-methoxyacetanilide | 5 | 3 | 2 | 0 | 2 | 3 | 3 | 2 | 3 | 3 | 3 | 3 | 0 | 1 | 1 | 3 | 15 | 10 | (¹) |
| | 1 | 3 | 1 | 0 | 3 | 3 | 1 | 0 | 0 | 3 | 3 | 3 | 1 | 0 | 0 | 3 | 16 | 7 | (¹) |
| 2-Bromo-N-tert-butyl-2'-methoxyacetanilide | 5 | 2 | 0 | 0 | 0 | 0 | 1 | 0 | 0 | 3 | 3 | 0 | 1 | 0 | 0 | 2 | 9 | 1 | (¹) |
| | 5 | 3 | 0 | 0 | 3 | 3 | 2 | 0 | 0 | 3 | 3 | 3 | 0 | 0 | 0 | 1 | 15 | 3 | (¹) |

*One species missing.  
¹ Surface application.  
² Incorporated in soil.

The data in Table I illustrate the general phytotoxic activity as well as the selective phytotoxic activity of representative N-substituted ortho-substituted α-haloacetanilides of this invention. It will be noted that haloacetanilides substituted with an alkyl group on the amide nitrogen atom and a substituent other than tertiary alkyl ortho to the amide nitrogen atom demonstrate outstanding general herbicidal activity at low rates of application. Thus, these α-haloacetanilides are particularly useful in pounds which do not have the structure of the N-substituted ortho-substituted α-haloacetanilides of this invention is demonstrated as follows. Pre-emergent greenhouse tests were used and the planting of the seeds was accomplished in the same manner as described above. The data obtained are reported in Table II wherein the identification of the seeds and the phytotoxic activity index have the same definition as above.

TABLE II.—COMPARISON OF PRE-EMERGENCE PHYTOTOXIC ACTIVITY OF VARIOUS ALPHA-HALOACETANILIDES

| Compound | Plant | | | | | | | | | | | | | | | Total Phytotoxic Rating | | Comments |
|---|---|---|---|---|---|---|---|---|---|---|---|---|---|---|---|---|---|---|
| | A | B | C | D | E | F | G | H | I | J | K | L | M | N | O | Grass | Broadleaf | |
| N-tert-Butyl-2-chloro-2'-methylacetanilide. | 3 | 3 | 3 | 3 | 3 | 3 | 2 | 2 | 3 | 3 | 3 | 2 | ---- | 3 | 3 | 18 | ¹15 | At 5 lb./acre. |
| N,2'-di-tert-Butyl-2-chloroacetanilide | 0 | 0 | 0 | 0 | 0 | 0 | 0 | 0 | 0 | 0 | 0 | 0 | 0 | 0 | 0 | 0 | 0 | Do. |
| 2-chloro-2'-methyl-N-(1-methylpropyl)acetanilide. | 2 | 1 | 0 | 0 | 0 | 3 | 0 | 0 | 3 | 3 | 3 | 0 | 3 | 0 | 0 | 9 | 6 | Do. |
| 2'-tert-Butyl-2-chloro-N-(1-methylpropyl)acetanilide. | 0 | 0 | 0 | 0 | 0 | 2 | 0 | 0 | 0 | 2 | 0 | ---- | 0 | 0 | 0 | 4 | ¹0 | Do. |
| 2-chloro-N,2'-dimethylacetanilide | 3 | 0 | 0 | 3 | 3 | 3 | 0 | 0 | 3 | 2 | 0 | 0 | 0 | 0 | 0 | 14 | 0 | At 0.05 lb./acre. |
| 2-chloro-N,3'-dimethylacetanilide | 0 | 0 | 0 | 0 | 2 | 0 | 0 | 0 | 0 | 0 | 0 | 0 | 0 | 0 | 0 | 2 | 0 | Do. |
| 2-chloro-N,4'-dimethylacetanilide | 0 | 0 | 0 | 0 | 0 | 0 | 0 | 0 | 0 | 0 | 0 | 0 | 0 | 0 | 0 | 0 | 0 | Do. |
| N-tert-Butyl-2-chloro-2'-methylacetanilide. | 3 | 2 | 3 | 0 | 3 | 3 | 1 | 2 | 3 | 3 | 3 | 2 | 1 | 2 | 3 | 15 | 14 | At 1 lb./acre. |
| N-tert-Butyl-2-chloro-4'-methylacetanilide. | 2 | 1 | 2 | 0 | 3 | 3 | 0 | 0 | 0 | 0 | 0 | 0 | 0 | 0 | 2 | 8 | 2 | Do. |
| 2-chloro-2'-isopropyl-N-methylacetanilide. | 2 | 0 | 0 | 0 | 2 | 3 | 0 | 0 | 3 | 3 | 0 | 0 | 0 | 0 | 0 | 11 | 0 | At 0.25 lb./acre. |
| 2-chloro-2'-isopropyl-6'-methylacetanilide. | 1 | 0 | 0 | 0 | 0 | 0 | 0 | 0 | 2 | 3 | 2 | 0 | 0 | 0 | 0 | 5 | 2 | Do. |
| N-tert-Butyl-2-chloro-2'-methylacetanilide. | 3 | 3 | 3 | 3 | 3 | 3 | 2 | 2 | 3 | 3 | 3 | 2 | ---- | 3 | 3 | 18 | ¹15 | At 5 lb./acre. |
| 4'-tert-Butyl-2-chloro-2'-methylacetanilide. | 0 | 0 | 0 | 0 | 0 | 0 | 0 | 0 | 0 | 0 | 0 | 0 | 0 | 0 | 0 | 0 | 0 | Do. |
| N-tert-Butyl-2-chloro-2'-methylacetanilide. | 3 | 3 | 3 | 3 | 3 | 3 | 2 | 2 | 3 | 3 | 3 | 2 | ---- | 3 | 3 | 18 | ¹15 | Do. |
| 2'-tert-Butyl-2-chloro-4'-methylacetanilide. | 0 | 0 | 0 | 0 | 0 | 0 | 0 | 0 | 0 | 0 | 0 | 0 | 0 | 0 | 0 | 0 | 0 | Do. |
| N-tert-Butyl-2-chloro-2'-methylacetanilide. | 3 | 3 | 3 | 3 | 3 | 3 | 3 | 3 | 3 | 3 | 3 | 2 | 3 | 3 | 3 | 18 | 20 | At 25 lb./acre. |
| N,4'-di-tert-Butyl-2-chloroacetanilide | 0 | 0 | 0 | 0 | 0 | 0 | 0 | 0 | 0 | 0 | 0 | 0 | 0 | 0 | 0 | 0 | 0 | Do. |
| 2-chloro-N,2'-dimethylacetanilide | 3 | 0 | 0 | 3 | 3 | 3 | 0 | 0 | 3 | 3 | 2 | 0 | 0 | 0 | 2 | 17 | 2 | At 1 lb./acre. |
| 4'-tert-Butyl-2-chloro-N-methylacetanilide. | 0 | 0 | 0 | 0 | 0 | 0 | 0 | 0 | 0 | 0 | 0 | 0 | 0 | 0 | 0 | 0 | 0 | Do. |
| 2-chloro-2'-methyl-N-(1-methylpropyl)acetanilide. | 2 | 1 | 0 | 0 | 0 | 3 | 0 | 0 | 3 | 3 | 3 | 0 | 3 | 0 | 0 | 9 | 6 | At 5 lb./acre. |
| 4'-tert-Butyl-2'-methyl-N-(1-methylpropyl)acetanilide. | 0 | 0 | 2 | 0 | 0 | 0 | 0 | 0 | 0 | 0 | 0 | 0 | 0 | 0 | 0 | 0 | 2 | Do. |
| 2-chloro-N-ethyl-2'-methylacetanilide | 3 | 0 | 0 | 3 | 3 | 3 | 0 | 1 | 3 | 3 | 3 | 0 | 0 | 1 | 3 | 18 | 5 | Do. |
| 4'-tert-Butyl-2-chloro-N-ethyl-2'-methylacetanilide. | 1 | 0 | 0 | 0 | 0 | 0 | 0 | 0 | 3 | 2 | 0 | 0 | 0 | 0 | 0 | 5 | 0 | Do. |
| N-tert-Butyl-2-chloro-2'-methylacetanilide. | 3 | 2 | 3 | 0 | 3 | 3 | 1 | 2 | 3 | 3 | 3 | 2 | 1 | 2 | 3 | 15 | 14 | At 1 lb./acre. |
| 2-bromo-N-tert-butyl-2'-methylacetanilide. | 0 | 0 | 0 | 0 | 0 | 0 | 0 | 0 | 1 | 2 | 0 | 0 | 0 | 0 | 0 | 3 | 0 | Do. |
| N-tert-Butyl-2-chloro-2'-ethylacetanilide. | 2 | 0 | 1 | 0 | 1 | 3 | 0 | 1 | 3 | 2 | 2 | 0 | ---- | 0 | 1 | 10 | ¹4 | Do. |
| 2-bromo-N-tert-butyl-2'-ethylacetanilide. | 0 | 0 | 0 | 0 | 0 | 0 | 0 | 0 | 0 | 0 | 0 | 0 | 0 | 0 | 0 | 0 | 0 | Do. |
| N-tert-Butyl-2-chloro-2'-methoxyacetanilide. | 3 | 1 | 3 | 3 | 1 | 3 | 0 | 0 | 3 | 3 | 3 | 1 | 0 | 0 | 3 | 16 | 7 | At 5 lb./acre. |
| 2-bromo-N-tert-butyl-2'-methoxyacetanilide. | 3 | 0 | 0 | 3 | 3 | 2 | 0 | 0 | 3 | 3 | 3 | 0 | 0 | 0 | 1 | 15 | 3 | Do. |
| N-tert-Butyl-2-iodo-2'-methoxyacetanilide. | 1 | 1 | 3 | 0 | 0 | 1 | 0 | 0 | 3 | 2 | 3 | 0 | 0 | 1 | 1 | 7 | 7 | Do. |

¹ One species missing.

The first comparison reported in Table II shows the critical nature of the ortho substituents of acetanilides both N-substituted and ortho-substituted. N-tert-butyl-2-chloro-2'-methylacetanilide, an acetanilide of this invention, has very severe phytotoxicity as an application rate of 5 lb./acre but upon changing the ortho substituent from a methyl group to a tert-butyl group, N,2'-di-tert-butyl-2-chloroacetanilide, the phytotoxic activity becomes 0 at the same application rate. Similarly, the herbicidal activity of the ortho methyl group, e.g., 2-chloro-2'-methyl-N-(1-methylpropyl)acetanilide, was very outstanding at 5 lb./acre, but the activity of the similar acetanilide having an ortho tert-butyl group instead of an ortho methyl group, 2'-tert-butyl-2-chloro-N-(1-methylpropyl)acetanilide, had almost no phytotoxic activity at the same rate of application.

In the second comparison in Table II, the detrimental effect on phytotoxic activity resulting from transferring the ortho alkyl group of an acetanilide of this invention to another position on the aromatic ring is demonstrated. Thus, 2-chloro-N,2'-dimethylacetanilide, which has a methyl group in an ortho position, has very outstanding phytotoxic activity at an application rate of 0.05 lb./acre, but 2-chloro-N,3'-dimethylacetanilide, which has the ortho methyl group substituted in a meta position, has almost no phytotoxic activity at the same application rate and 2-chloro-N,4'-dimethylacetanilide, which has the ortho methyl group substituted in the para position, has no phytotoxic activity at the same rate of application. Similarly, the phytotoxic activity of N-tert-butyl-2-chloro-2'-methylacetanilide is severely reduced at an application rate of 1 lb./acre by substituting the ortho methyl group in the para position.

The effect on phytotoxic activity resulting from removing the N-alkyl group from the acetanilide of this invention and substituting that alkyl group on the aromatic ring is shown in the third comparison reported in Table II. Thus, removing the methyl group from 2-chloro-2'-isopropyl-N-methylacetanilide, an acetanilide of this invention, and substituting the same in an ortho position, as in 2-chloro-2'-isopropyl-6'-methylacetanilide, results in a severe reduction in phytotoxic activity at an application rate of 0.25 lb./acre. Similarly, removing the N-tert-butyl group from N-tert-butyl-2-chloro-2'-methylacetanilide and substituting it in the para position of 4'-tert-butyl-2-chloro-2'-methylacetanilide results in the acetanilide having no phytotoxic activity at an application rate of 5 lb./acre.

In the fourth comparison reported in Table II, the N-substituent is substituted in an ortho position and the ortho-substituent is placed in the para position. However, the phytotoxic activity of the acetanilide thus formed, 2'-tert-butyl-2-chloro-4'-methylacetanilide, is non-existent at an application of 5 lb./acre whereas the related N-tert-butyl-2-chloro-2'-methylacetanilide of this invention has severe phytotoxicity at the same rate of application.

The fifth comparison reported in Table II shows that removing a primary ortho alkyl substituent and substituting a tertiary alkyl in the para position on the aromatic ring completely destroys the phytotoxic activity of the acetanilide. For example, N-tert-butyl-2-chloro-2'-methylacetanilide, an acetanilide of this invention, has severe phytotoxicity at an application rate of 25 lb./acre whereas N,4'-di-tert-butyl-2-chloroacetanilide, which has no ortho substituent but there is a tert-butyl group in the para position, has no phytotoxic activity at the same application rate. Also, 2-chloro-N,2'-dimethylacetanilide is a very good phytotoxicant at an application rate of 1 lb./acre but 4'-tert-butyl-2-chloro-N-methylacetanilide, which has no ortho methyl group but which has a tert-butyl group in the para position, has no phytotoxic activity at the same application rate.

The sixth comparison reported in Table II demonstrates that the addition of a tert-butyl group on the aromatic ring of an acetanilide of this invention destroys the phytotoxic activity of the acetanilide. Thus, 2-chloro-2'-methyl-N-(1-methylpropyl)acetanilide and 2-chloro-N-ethyl-2'-methylacetanilide, acetanilides of this invention, have very outstanding phytotoxic activity at an application rate of 5 lb./acre but 4'-tert-butyl-2'-methyl-N-(1-methylpropyl) acetanilide and 4'-tert-butyl-2-chloro-N-ethyl-2'-methylacetanilide, which are acetanilides having a tert-butyl group in the para position, have almost no phytotoxic activity at the same rate of application.

In the next comparison reported in Table II, the effect of the nature of the alpha-halo group is demonstrated. For example, acetanilides having ortho alkyl substituents and alpha-chloro groups, e.g., N-tert-butyl-2-chloro-2'-methylacetanilide and N - tert - butyl-2-chloro-2'-ethylacetanilide, have outstanding phytotoxic activity but the same acetanilide having an alpha-bromo group instead of an alpha-chloro group has no phytotoxic activity at the same rate of application.

The last comparison reported in Table II shows that alkoxy-substituted acetanilides having either an alpha-chloro or an alpha-bromo group are active phytotoxicants but the similar acetanilide having an alpha-iodo group is inactive at the same rate of application. Thus, N-tert-butyl-2-chloro-2'-methoxyacetanilide and 2-bromo-N-tert-butyl-2'-methoxyacetanilide have phytotoxic activity at an application rate of 5 lb./acre but N-tert-butyl-2-iodo-2'-methoxyacetanilide has no phytotoxic activity.

The data in Example 2 clearly demonstrate the critical effect on phytotoxic activity of the nature of the nuclear-substituted alkyl groups, their location with respect to the nitrogen atom, and the nature of the alpha-halo group. In order to have very high unit activities and wide plant spectrums, the alpha-haloacetanilide must be one which has a non-tertiary alkyl substituent ortho with respect to the amide nitrogen atom, an alkyl group on the amide nitrogen atom, and no other substitutions on the aromatic ring.

EXAMPLE 3

The post-emergent activity of some of the N-substituted ortho-substituted α-haloacetanilides useful in the compositions of this invention was determined in greenhouse tests. The alpha-halocetanilide to be tested was applied in spray form to 21-day old specimens of the same grasses and broadleaf plants as used in the pre-emergent tests described in Example 1. The same number of seeds of the same plants used in Example 1 were planted in the 9½" x 5¾" x 2¾" aluminum pans arranged in the same manner with a soybean seed in diagonal corners as described in Example 1. After the plants were 21-days old each aluminum pan was sprayed with 6 ml. of a 0.5% concentration solution of the candidate chemical, corresponding to a rate of approximately 9 lbs. per acre. This phytotoxic solution was prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent was a mixture comprising 35 weight percent butylamine dodecylbenzene sulfonate and 65 weight percent of a tall oil-ethylene oxide condensate having about 6 moles of ethylene oxide per mole of tall oil. The injuries to the plants were observed 14 days later and are reported in Table III. The post-emergent phytotoxic activity index used in this example is based on the average percent injury of each plant species and is defined as follows:

| Average Percent Injury | Numerical Scale | Phytotoxic Activity |
| --- | --- | --- |
| 0-25 | 0 | No phytotoxicity. |
| 26-50 | 1 | Slight phytotoxicity. |
| 51-75 | 2 | Moderate phytotoxicity. |
| 76-99 | 3 | Severe phytotoxicity. |
| 100 | 4 | Plants dead. |

TABLE III.—POST-EMERGENT PHYTOTOXIC ACTIVITY OF CERTAIN ORTHO-SUBSTITUTED ALPHA-HALOACETANILIDES

| Compound | General Grass | General Broadleaf |
| --- | --- | --- |
| N-tert-butyl-2-chloro-2'-methylacetanilide | 1 | 1 |
| 2-chloro-N,2'-di(1-methylpropyl)acetanilide | 1 | 1 |
| N-tert-butyl-2-chloro-2'-ethylacetanilide | 0 | 1 |
| 2-chloro-N-isopropyl-2'-methylacetanilide | 3 | 1 |
| 2-chloro-2'-methyl-N-(1-methylpropyl)acetanilide | 1 | 1 |
| 2-chloro-2'-isopropyl-N-methylacetanilide | 0 | 1 |
| 2-chloro-N-ethyl-2'-methylacetanilide | 0 | 2 |
| 2-chloro-N,2'-dimethylacetanilide | 1 | 1 |
| 2-bromo-N,2'-dimethylacetanilide | 1 | 4 |
| N-tert-butyl-2-chloro-2'-methoxyacetanilide | 0 | 1 |
| 2-bromo-N-tert-butyl-2'-methoxyacetanilide | 0 | 3 |

EXAMPLE 4

The pre-emergence phytotoxic activity of certain N-substituted ortho-substituted α-haloacetanilides was determined in a field test. For this test, the following liquid compositions were prepared:

*Composition A having solution temperature of +2° C. and containing 3 lb./gal. active ingredient*

| | Wt. percent |
| --- | --- |
| 2-chloro-N,2'-dimethylacetanilide | 37.69 |
| Xylene | 57.31 |
| Surface active agent A [1] | 4.00 |
| Surface active agent B [1] | 1.00 |
| | 100.00 |

*Composition B having solution temperature of +4° C. and containing 4 lb./gal. active ingredient*

| | Wt. percent |
| --- | --- |
| N-tert-butyl-2-chloro-2'-methylacetanilide (95° pure) | 51.47 |
| Xylene | 43.53 |
| Surface active agent C [2] | 2.50 |
| Surface active agent C [3] | 2.50 |
| | 100.00 |

[1] Surface active agents A and B are non-ionic and ionic blends of surface active agents of alkyl-phenol-ethylene oxide condensate plus an alkyl-arylsulfonate available from Witco Chemical Company and identified as Emcol AD-17-27A and Emcol AD-18-11C, respectively.

[2] Surface active agent C is a non-ionic surface active agent comprising a fatty acid-ethylene oxide condensate available from Geigy Chemical Company and identified as Alrodyne 6104.

[3] Surface active agent D is a non-ionic and ionic blend of surface active agents of a long-chain alkylphenol-ethylene oxide condensate (5-15 moles) and an alkylarylsulfonate available from Antara Chemicals Company as Antarate 9181.

Certain plants (listed in Table IV) were planted in 100-foot rows one foot apart as Hazelwood, Mo., in the spring. The emulsifiable composition was applied the day following the planting parallel to the rows at a decreasing logarithmic rate starting at 6 lbs./acre at one end of the rows and decreasing to 0.015 lb./acre at the other end of the rows. Water was used as the carrier in applying the emulsifiable composition. The plants were inspected approximately 3 weeks and 6 weeks after planting to pinpoint the minimum rates at which slight injury and complete kill occurred. The data obtained are reported in Table IV.

TABLE IV.—PRE-EMERGENCE FIELD TESTS OF CERTAIN N-SUBSTITUTED ORTHO-SUBSTITUTED ALPHA-HALOACETANILIDES

| | Composition B | | Composition A | |
|---|---|---|---|---|
| | Rate for Complete Kill, lb./acre | Rate for Slight Injury, lb./acre | Rate for Complete Kill, lb./acre | Rate for Slight Injury, lb./acre |
| Cantaloupe | ¹6 | 5.7 | ¹6 | 4.0 |
| Tomato | 5.5 | 1.8 | ¹6 | 1.7 |
| Cotton | ¹6 | 4.1 | ¹6 | 5.5 |
| Flax | ¹6 | 5.3 | ¹6 | 5.3 |
| Soybean | ¹6 | 3.3 | ¹6 | 1.8 |
| Snapbean | ¹6 | 1.14 | ¹6 | 5.5 |
| Peas | ¹6 | 5.3 | | ¹6 |
| Alfalfa | ¹6 | 0.72 | ¹6 | 1.8 |
| Radish | | ¹6 | ¹6 | 5.5 |
| Sugarbeet | ¹6 | 4.1 | 5.4 | 1.55 |
| Corn | | ¹6 | | ¹6 |
| Oats | ¹6 | 2.9 | ¹6 | 2.9 |
| Barley | ¹6 | 5 | ¹6 | 2.75 |
| Horsenettle | ¹6 | 2.5 | | |
| Pigweed | ¹5.7 | 0.15 | 5.5 | 0.7 |
| Lambsquarter | ¹6 | 3.3 | | |
| Smartweed | ¹6 | 3.9 | ¹6 | 3.9 |
| Johnson Grass | ¹6 | 1.8 | | ¹6 |
| Barnyard Grass | 0.72 | 0.17 | 5.4 | 0.77 |
| Crabgrass | 4.7 | 0.56 | 2.2 | 0.65 |
| Brome | 2.8 | 0.85 | 1.45 | 0.28 |

¹ Means greater than 6.

As demonstrated in the examples above, quite different effects can be obtained by modifying the method of use of the phytotoxic compositions of this invention. Thus, unusual grass specificity can be achieved at lower levels of application whereas at higher levels of application a more general phytotoxic effect or soil sterilization takes place. Therefore, an essential part of this invention is the formulation of the phytotoxic compositions that permit a uniform predetermined application of the active ingredient to the soil or plant to produce the desired effect.

In general, the N-substituted ortho-substituted α-haloacetanilides of this invention are insoluble in water and somewhat soluble in many organic solvents. The active ingredient need not be dissolved in the extending agent but may merely be dispersed or suspended therein as a suspension or emulsion. Also, the α-haloacetanilides may first be dissolved in a suitable organic solvent and the organic solution of the active ingredient then incorporated in water or an aqueous extending agent to form a heterogenous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid adjuvants in the form of particulate solids are very useful in the practice of the present invention because of the low solubility properties of the α-haloacetanilides of this invention. In using this type of adjuvant, the active ingredient is either adsorbed or dispersed on or in the finely divided solid material. Preferably the solid materials are not hygroscopic but are materials which render the composition permanently dry and free flowing. Suitable particulate solids include the natural clays, such as china clays, the bentonites and the attapulgites; other minerals in natural state, such as talc, pyrophyillite, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood, and powdered pecan or walnut shells. These materials are used in finely-divided form, at least in a size range of 20–40 mesh and preferably in much finer size.

The surface active agent, that is the wetting, emulsifying, or dispersion agent, used in the phytotoxic compositions of this invention to serve in providing uniform dispersions of all formulation components in both liquid and particulate solid form can be anionic, cationic, non-ionic, or mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The liquid phytotoxic compositions of this invention preferably comprise 0.01% to 99% by weight of the active ingredient with the remainder being phytotoxic adjuvant which can be liquid extending agent or surface active agent (including adhesive agent), but preferably is an admixture thereof. Preferably, the surface active agent comprises from 0.1% to 15% by weight of the total concentrate composition. The remainder of the composition is the liquid extending agent.

The concentration of active ingredient in the particulate solid or dust compositions of this invention can vary over wide ranges depending upon the nature of the solid adjuvant and the intended use of the composition. Since the active ingredients of this invention have very high toxicities and are applied at very low rates in order to obtain selectivity, the concentration of the active ingredient in the dust composition can be very low and may comprise as little as 1% or less by weight of the total dust composition. By contrast, when the dust composition is to be used for soil sterilization, it may be desirable to have a very high concentration of active ingredient and for such use the active ingredient can comprise as much as 5% to 99% by weight of the total composition. The remainder of the composition is the phytotoxic adjuvant which is usually only the particulate solid extending agent. Thus, a surface active agent is not usually required in dust compositions although they can be used if desired. However, if the particulate solid compositions are to be applied as a wettable powder, a surface active agent must be added. Ordinarily the amount of surface active agent will be in the range of 0.1% to 15% by weight of the phytotoxic composition.

The phytotoxic compositions of this invention can also contain other additaments, for example fertilizers, pesticides and the like, used as adjuvant or in combination with any of the above-described adjuvants. Phytotoxicants useful in combination with the above-described compounds include for example 2,4-dichlorophenoxyacetic acids, 2,4,5 - trichlorophenoxyacetic acid, 2 - methyl - 4-chlorophenoxyacetic acid and the salts, esters and amides thereof; triazine derivatives, such as 2,4-bis(3-methoxypropylamino)-6-methylthio-S-triazine; 2-chloro-4-ethylamino-6-isopropylamino-S-triazine, and 2-ethylamino-4-isopropylamino-6-methylmercapto-S-triazine; urea derivatives, such as 3-(3,4-dichlorophenyl)-1,1-dimethyl urea and 3-(p-chlorophenyl)-1,1-dimethyl urea, and acetamides such as N,N - dially - α-chloroacetamide, N-(α-chloroacetyl)hexamethylene imine, and N,N-diethyl-α-bromoacetamide, and the like. Fertilizers useful in combination with the active ingredients include for example ammonium nitrate, urea and superphosphate. Other useful additaments include materials in which plant organisms take root and grow such as compost, manure, humus, sand and the like.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, the dust and liquid compositions are applied to the soil according to conventional methods and are preferably distributed in the soil to a depth of at least ½-inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by conventional means such as discing, dragging or mixing operations.

The application of an effective amount of active ingredient to the plant is essential in the practice of the present invention. The exact dosage to be applied is dependent not only upon the specific α-haloacetanilide but also upon the particular plant species to be controlled and the stage of growth thereof as well as the part of the plant to be contacted with the toxicant. In non-selective foliage treatments, the phytotoxic compositions of this invention are usually applied at a range sufficient to obtain from 5 to 50 lbs. of α-haloacetanilide per acre but lower or higher rates might be applied in some cases. In non-selective pre-emergent treatments, the phytotoxic compositions are usually applied at a somewhat lower rate than in foliage treatments but at a rate which is ordinarily within the same general range, that is at a rate in the range of 1 to 25 lbs. per acre. However, because of the unusually high unit activity possessed by the α-haloacetanilides of this invention, soil sterilization is ordinarily accomplished at a rate of application in the range of 3–9 lbs. per acre. In selective pre-emergent applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

The terms "soil" and "growth media" are employed in the present specification and claims in their broadest sense to be inclusive of all conventional "soils" as defined in Webster's New International Dictionary, Second Edition, Unabridged (1961). Thus the terms refer to any substance or media in which vegetation may take root and grow, and are intended to include not only earth but compost, manure, muck, humus, sand and the like, adapted to support plant growth.

The embodiments of the invention in which an exclusive property or privilege is claimed are defined as follows:

1. Composition comprising an adjuvant and a herbicidal effective amount of the formula

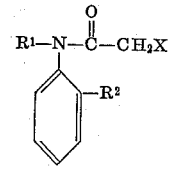

wherein $R^1$ is alkyl of not more than 6 carbon atoms, $R^2$ is alkoxy of not more than 4 carbon atoms and X is selected from the group consisting of chlorine and bromine.

2. Composition of claim 1 together with a surface active agent.

3. Composition of claim 1 wherein the compound is N-t-butyl-2-chloro-2′-methoxyacetanilide.

4. Composition of claim 1 wherein the compound is 2-bromo-N-p-butyl-2′-methoxyacetanilide.

5. Composition of claim 1 wherein $R^1$ is t-butyl.

6. Method which comprises exposing a plant to a herbicidally active amount of a compound of the formula

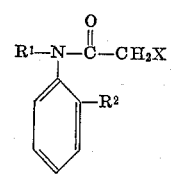

wherein $R^1$ is alkyl of not more than 6 carbon atoms, $R^2$ is alkoxy of not more than 4 carbon atoms and X is selected from the group consisting of chlorine and bromine.

7. Method which comprises pre-emergently exposing plants to a selective herbicidal amount of a compound of the formula

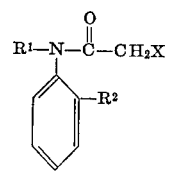

wherein $R^1$ is alkyl of not more than 6 carbon atoms, $R^2$ is alkoxy of not more than 4 carbon atoms and X is selected from the group consisting of chlorine and bromine.

8. Method of claim 6 wherein $R^1$ is t-butyl.

9. Method of claim 6 wherein the compound is N-t-butyl-2-chloro-2′-methoxyacetanilide.

10. Method of claim 6 wherein the compound is 2-bromo-N-p-butyl-2′-methoxyacetanilide.

References Cited

UNITED STATES PATENTS

| | | | |
|---|---|---|---|
| 2,863,752 | 12/1958 | Hamm et al. | 71—2.3 |
| 2,912,438 | 11/1959 | Oxley et al. | 260—562 |
| 2,948,736 | 8/1960 | Martin | 260—562 |

FOREIGN PATENTS 21,876   7/1958   Republic of South Africa.

OTHER REFERENCES

Leonard et al.: Jour. Bacteriology, vol. 55, pages 339–349 (1949).

LEWIS GOTTS, *Primary Examiner.*

JAMES O. THOMAS, JR., *Examiner.*